United States Patent Office 3,763,237
Patented Oct. 2, 1973

3,763,237
SUBSTITUTED HALOPHENOXYAMIDINE
ACETALS
Edward R. Freiter, Midland, Mich., assignor to The
Dow Chemical Company, Midland, Mich.
No Drawing. Filed Apr. 11, 1972, Ser. No. 243,076
Int. Cl. C07c 123/00
U.S. Cl. 260—564 R  3 Claims

ABSTRACT OF THE DISCLOSURE

Halophenoxyamidine acetal compounds such as 2-(3,4-dichlorophenoxy) - N - (formylmethyl)acetamidine dimethylacetal and their pharmaceutically-acceptable salts are prepared by the reaction of a substituted phenoxyacetimidate with an aminoacetaldehyde dialkylacetal. The compounds have pharmacological activity as antidepressants.

BACKGROUND OF THE INVENTION

Description of the prior art

The substituted phenoxyamidine acetal compounds of the invention can be prepared by procedures analogous to known methods. Typical methods which can be employed include the reaction of a dihalophenoxyacetonitrile with ethanol in ethereal hydrogen chloride in a Pinner imidate synthesis, and the reaction of the resulting imidate with an aminoacetaldehyde dialkyl acetal in a procedure similar to that of Lawson, J. Chem. Soc. 1957, 4225–8.

SUMMARY OF THE INVENTION

This invention is directed to substituted halophenoxyacetamidine acetal compounds and is particularly directed to such substituted compound and their pharmaceutically-acceptable salts corresponding to the formula:

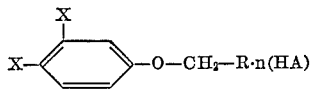

(I)

wherein X represents chloro or bromo, R represents (2,2-dialkoxyethyl)imidino, in which the alkoxy moieties are selected from methoxy and ethoxy, $n$ represents one of the integers zero or one and A represents the anionic moiety of a pharmaceutically-acceptable acid.

The compounds of the invention are solids at ordinary temperatures, and are variously soluble in conventional solvents such as water, alcohols, ether, benzene, chlorinated hydrocarbons and the like. The compounds of the invention are most conveniently named as 2-(3,4-dihalophenoxy)-N - (formylmethyl)acetamidine dialkylacetals, and for convenience, they will be referred to generically herein as "substituted amidines." The term "pharmaceutically-acceptable salt" as herein employed refers to salts of a substituted amidine which are substantially non-toxic at dosages consistent with good pharmacological activity. Such pharmaceutically-acceptable salts include non-toxic acid addition salts with inorganic acids such as hydrochloric, hydrobromic, sulfuric or phosphoric acid, or with organic acids such as acetic, succinic, malic, maleic, tartaric or citric acid, or with organic sulfonic acids such as methanesulfonic or p-toluenesulfonic acid.

The substituted amidine compounds of the invention can tautomerize between N and N' formylmethyl forms as indicated by Formulae II and III below.

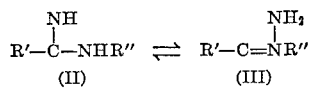

wherein R' represents the 3,4 - dihalophenoxymethyl moiety and R" represents the 2,2-dialkoxyethyl moiety, as described above with reference to Formula I. The tautomeric forms of the substituted amidines can be regarded as essentially equivalent for purposes of the invention, and the invention includes the substituted amidine compounds in both tautomeric forms, or in mixtures thereof. For convenience, individual substituted amidine compounds can be referred to as 2-(3,4-dihalophenoxy)-N-(formylmethyl)-acetamidine dialkylacetals, it being understood that such nomenclature includes both the N and N' tautomeric forms.

The substituted amidines of the invention have been found to be useful for administration to laboratory animals in the study of drug effects on the central nervous system, and are particularly useful as antidepressants, as indicated by their antagonism of the depressant effects of reserpine and their potentation of amphetamine.

The substituted amidines of the invention are prepared by the reaction of the corresponding substituted phenoxyacetimidate with an aminoacetaldehyde dialkylacetal, preferably in an inert, organic liquid, such as methanol or ethanol, as a reaction medium.

The compounds of the invention are conveniently prepared using a 3,4-dihalophenoxyacetonitrile starting material by a two-step process illustrated below:

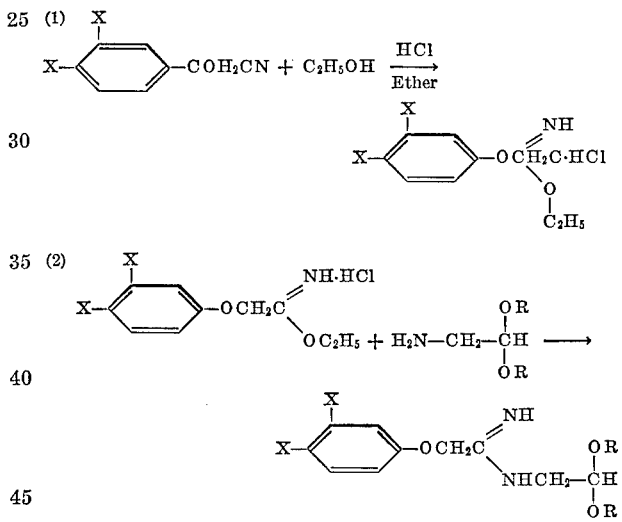

in the above formulae, the moieties X and R have the significance first set out above.

The first step proceeds when the phenoxyacetonitrile is intimately mixed with ethanol and a catalytic amount of hydrogen chloride in diethyl ether. The reaction proceeds at temperatures of from about −5° C. to 50° C., and is conveniently carried out at room temperature. After the reaction mixture has been held for a period sufficient for the production of sufficient amount of the 3,4-dihaloacetimidate as the hydrochloride (generally from about 0.25 to about 2 hours), the ethyl 3,4-dihalophenoxyacetimidate hydrochloride is separated by stripping off the ether under vacuum. The ethyl 3,4-dihalophenoxyacetimidate hydrochloride starting material is then reacted with an aminoacetaldehyde dialkylacetal to prepare the substituted amidine.

In preparing the substituted amidines, the reaction proceeds when the 3,4-dihalophenoxyacetimidate and aminoacetaldehyde dialkylacetal are contacted and mixed in the presence of an inert liquid reaction medium such as methanol, ethanol, or isopropanol. The reaction proceeds at temperatures from about −10° C. to about 40° C. and is preferably carried out at temperatures of from about 0° C. to about 25° C. The exact proportions of the reactants to be employed can be varied, however, the reaction consumes the reactants in equimolar proportions and the use of the reactants in such proportions is preferred. The reaction is generally complete in about 10 to 48 hours, depending on the temperature employed. The product can be separated by evaporation of the reaction medium under reduced pressure to obtain the substituted amidine compound. The product can be purified by conventional techniques such as washing and recrystallization from water, alcohols, dioxane and alcohols, and the like. Alternatively, it can be converted to a pharmaceutically-acceptable salt.

The pharmaceutically-acceptable salts of the free base substituted amidines can be prepared by dissolving the free base in a minimal amount of alcohol or ether and adding an alcohol or ether solution of an acid such as hydrochloric acid, hydrobromic acid, malic acid, maleic acid or succinic acid until precipitation of the corresponding salt is complete. In carrying out the salt formation reaction, it is generally desirable to employ substantially anhydrous organic liquid reaction media, and to maintain the mixture at a temperature of about 0° to about 30° C. to minimize formation of byproducts. The salt can further be purified by recrystallization or converted to the free base form.

The free base substituted amidine can be prepared by hydrolysis of the salt in aqueous base. The salt is mixed with a molar equivalent amount of sodium hydroxide in aqueous solution, excess aqueous sodium carbonate or the like, after which the free base can be separated by extraction with an organic solvent. The solvent can be removed by conventional methods such as evaporation or distillation. The product can be purified by conventional procedures such as washing or recrystallization.

DESCRIPTION OF THE PREFERRED EMBODIMENTS

The following representative example illustrates the invention:

10.1 grams of 3,4-dichlorophenoxyacetonitrile are added to a solution of 2.3 grams of ethanol and 100 milliliters of diethylether and the mixture is cooled in a Dry Ice-acetone bath. Hydrogen chloride gas is bubbled into the mixture with stirring until the mixture is saturated. During the addition of the hydrogen chloride the temperature of the reaction mixture is maintained between −5° and +5° C. After the addition of the hydrogen chloride is completed, the mixture is stirred for about one hour and then evaporated to dryness under dry nitrogen. The resulting ethyl 3,4-dichlorophenoxyacetimidate hydrochloride is washed with dry ether and dissolved in 150 milliliters of ethanol. The resulting solution is cooled to a temperature of about 0° C. in an ice bath and 5.25 grams of aminoacetaldehyde dimethylacetal are added. The resulting mixture is stirred for about 3 hours at a temperature of 0° C. then at about 25° C. for 48 hours, then evaporated to dryness under reduced pressure. The evaporated residue is taken up with methylene chloride. The 2 - (3,4 - dichlorophenoxy)-N-(formylmethyl)acetamidine dimethylacetal hydrochloride product precipitates from the methylene chloride, and is recovered as a solid. The 2-(3,4 - dichlorophenoxy)-N-(methylformyl)acetamidine dimethylacetal hydrochloride product is purified by recrystallization three times from ethanol and found to melt at a temperature of 125°–127° C. The product is found by elemental analysis to have carbon, hydrogen and nitrogen contents of 41.99, 4.98 and 8.22 percent, respectively (average of two determinations), as compared to the theoretical contents of 41.94, 4.99 and 8.15 percent, respectively, calculated for the named structure. The structure of the product is confirmed by both infrared and nuclear magnetic resonance analysis.

In substantially the same procedure as that described above 2-(3,4 - dibromophenoxy)-N-(methylformyl)acetamidine dimethylacetal hydrochloride is prepared by employing 3,4-dibromophenoxyacetonitrile as a starting material; and 2-(3,4-dichlorophenoxy)-N-(methylformyl)acetamidine diethylacetal hydrochloride is prepared by substitution of aminoacetaldehyde diethylacetal in lieu of the aminoacetaldehyde dimethylacetal in the above procedure.

In a representative operation, separate groups of mice of similar origin and past history (10 mice per group) are administered 2-(3,4-dichlorophenoxy)-N-(formylmethyl) acetamidine dimethylacetal hydrochloride by intraperitoneal injection at a dosage rate of 31.6 milligrams of test compound per kilogram of animal body weight. Thirty minutes after the administration of the test compounds, the mice are administered reserpine at a dosage rate of 5 milligrams per kilogram by intraperitoneal injection. The mice are then observed for 45 minutes for symptoms of reserpine-induced depression. The administration of 5 milligrams per kilogram of reserpine intraperitoneally to mice results in a classical progression of depressive symptoms beginning with a characteristic dropping of the eyelids (ptosis) and later culminating in a generalized depression with decreased spontaneous motor activity and decreased responsiveness to auditory and tactile stimuli. Protection from reserpine-induced depression is indicated by the absence of the characteristic ptosis and observation of normal spontaneous motor activity and normal responsiveness to auditory or tactile stimuli. In these operations, all of the mice are found to have been protected from reserpine-induced depression.

In similar operations, the 50 percent effective dosage (ED 50) of 2-(3,4-dichlorophenoxy)-N-(formylmethyl)-acetamidine dimethylacetal hydrochloride for protection against reserpine-induced depression is determined to be 6.2 milligrams per kilogram. In a comparison operation, the compound 2-(2,6-dichlorophenoxy)-N-(formylmethyl)-acetamidine dimethylacetal hydrochloride is found to protect none of the mice tested when administered intraperitoneally at a rate of 25.1 milligrams per kilogram.

What is claimed is:

1. A compound corresponding to the formula

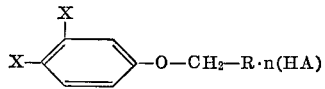

wherein X represents chloro or bromo, R represents N-(2,2-dialkoxyethyl)amidino, in which the alkoxy moieties are selected from the group consisting of methoxy and ethoxy, n represents one of the integers zero and one and A represents the anionic moiety of a pharmaceutically-acceptable acid.

2. A compound of claim 1 wherein X is chloro.

3. A compound of claim 1 wherein the compound is 2-(3,4-dichlorophenoxy)-N-(methylformyl)acetamidine dimethylacetal hydrochloride.

References Cited

UNITED STATES PATENTS 2,911,440    11/1959    Thuillier _____ 260—564 R

OTHER REFERENCES

Lawson J. Chem. Soc. (London) 1957, pp. 4225–28.
Chemical Abstracts, vol. 54, column 15024(f).

LEON ZITVER, Primary Examiner

G. A. SCHWARTZ, Assistant Examiner

U.S. Cl. X.R.

260—501.14, 453 R; 424—326

UNITED STATES PATENT OFFICE
CERTIFICATE OF CORRECTION

Patent No. 3,763,237  Dated  October 2, 1973

Inventor(s) Edward R. Freiter

It is certified that error appears in the above-identified patent and that said Letters Patent are hereby corrected as shown below:

Column 1, last paragraph, formulae II and III should read as follows to correct the "C" to "NH" and "$NH_2$" bonds:

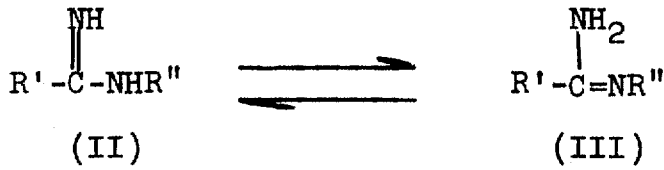

Column 2, line 16, "potentation" should read ---potentiation---.

Column 1, third line after SUMMARY OF THE INVENTION, "compound" should read ---compounds---.

Signed and sealed this 17th day of September 1974.

(SEAL)
Attest:

McCOY M. GIBSON JR.
Attesting Officer

C. MARSHALL DANN
Commissioner of Patents